US012797784B2

(12) United States Patent
Jastrzebski et al.

(10) Patent No.: US 12,797,784 B2
(45) Date of Patent: Nov. 17, 2026

(54) PROCESS AND EQUIPMENT FOR CONDUCTING RESEARCH ON ADSORPTION OF COMPOUNDS TO SOLIDS

(71) Applicant: Avantium Technologies B.V., Amsterdam (NL)

(72) Inventors: Robin Jastrzebski, Amsterdam (NL); Roelandus Hendrikus Wilhelmus Moonen, Amsterdam (NL); Erik-Jan Ras, Amsterdam (NL)

(73) Assignee: Avantium Technologies B.V., Amsterdam (NL)

( * ) Notice: Subject to any disclaimer, the term of this patent is extended or adjusted under 35 U.S.C. 154(b) by 274 days.

(21) Appl. No.: 18/697,844

(22) PCT Filed: Oct. 25, 2022

(86) PCT No.: PCT/EP2022/079699
§ 371 (c)(1),
(2) Date: Apr. 2, 2024

(87) PCT Pub. No.: WO2023/072894
PCT Pub. Date: May 4, 2023

(65) Prior Publication Data

US 2024/0399285 A1 Dec. 5, 2024

(30) Foreign Application Priority Data

Oct. 28, 2021 (EP) .................................... 21205320

(51) Int. Cl.
*B01D 53/04* (2006.01)
*G01N 30/20* (2006.01)
(Continued)

(52) U.S. Cl.
CPC ..... *B01D 53/0446* (2013.01); *B01D 53/0423* (2013.01); *B01D 53/0454* (2013.01);
(Continued)

(58) Field of Classification Search
None
See application file for complete search history.

(56) References Cited

U.S. PATENT DOCUMENTS 4,489,593 A * 12/1984 Pieters ............... G01N 15/0893 73/865.5
6,855,258 B2 * 2/2005 Petro ...................... G01N 30/24 210/198.2
(Continued)

OTHER PUBLICATIONS

PCT International Preliminary Report on Patentability dated Jan. 10, 2024; PCT/EP2022/079699.
(Continued)

*Primary Examiner* — Eric S. McCall
*Assistant Examiner* — Nigel H Plumb
(74) *Attorney, Agent, or Firm* — Suiter Swantz IP

(57) ABSTRACT

Apparatus for conducting research on adsorption properties of particulate solid adsorption materials for an adsorbate in at least two parallel adsorption beds, and method of using such. The apparatus contains multiple parallel beds of adsorbent, of a comparatively small volume between 0.1 to 10 ml, which are connected to two feeds via a splitter for each feed and capillaries downstream of the splitter and upstream of the adsorption bed. The invention further relates to a method using such apparatus.

14 Claims, 2 Drawing Sheets

(51) Int. Cl.
*G01N 30/46* (2006.01)
*G01N 30/02* (2006.01)

(52) U.S. Cl.
CPC ........... *G01N 30/20* (2013.01); *G01N 30/466* (2013.01); *B01D 2253/102* (2013.01); *B01D 2257/104* (2013.01); *B01D 2257/304* (2013.01); *B01D 2257/504* (2013.01); *B01D 2257/708* (2013.01); *B01D 2258/06* (2013.01); *B01D 2259/40003* (2013.01); *G01N 2030/025* (2013.01)

(56) References Cited

U.S. PATENT DOCUMENTS

| | | | | |
|---|---|---|---|---|
| 11,125,732 B2 * | 9/2021 | Gentner | G01N 30/88 | |
| 2007/0122314 A1 * | 5/2007 | Strand | B29C 65/1635 | 422/400 |

OTHER PUBLICATIONS

PCT International Search Report and Written Opinion dated Jan. 13, 2023; PCT/EP2022/079699.

S. Marsteau et al, INRS Hygiene et Securite de Travail, 222, pp. 19-25, 2011.

* cited by examiner

PROCESS AND EQUIPMENT FOR CONDUCTING RESEARCH ON ADSORPTION OF COMPOUNDS TO SOLIDS

The invention relates to a process and equipment for conducting research on adsorption of compounds (typically: compounds that are gaseous or can be evaporated easily) to solids. More specifically the invention relates to equipment for performing the above on small scale and in parallel, so that various adsorption materials and/or compounds to be adsorbed can be tested efficiently.

BACKGROUND OF THE INVENTION

Low concentrations of various compounds like volatile organic compounds (VOC's) but also (in)organic gasses like $NH_3$, $SO_2$, $H_2S$, CO, $CO_2$ etcetera can be present in (chemical) industrial environments in gasses such as air. Similarly, vapours of fuel (diesel, petrol, kerosene) or solvents like cyclohexane, benzene etc can form in air when handling fuel. Presence of such compounds in air is often undesired, and hence techniques have been developed to scavenge such compounds. Typically, this is done by passing the gas (typically air) that contains such undesired compounds over or through a bed of adsorptive material. A well-known material for such is activated carbon.

Adsorption of low concentrations of the various stated compounds (hereafter: adsorbate) to solids like activated carbon (but also other materials) is a topic of research for e.g. production of gasmasks for personal protective equipment (also known as respiratory protective device), and for other areas like on handling chemical compounds. Adsorption of higher concentrations of adsorbates can be employed for separation processes (like removal of hydrogen from industrial gas mixes and removal of $CO_2$ for exhaust gas) or purification processes, like obtaining oxygen from air. Research is being conducted for these various areas of application of adsorption. Typically, such research is done using amounts of adsorbent material of around 10-200 gram. See e.g. S. Marsteau et al, INRS Hygiène et Sécurité de Travail, 222, pages 19-25, 2011. Additionally, such is typically done in single test beds. It involves generally pre-conditioning the adsorbent material with a carrier gas. For reliable results typically such carrier gas is the same as the gas that contains the adsorbate, but then without such adsorbate being present. As an example, when it is desired to test a new activated carbon for adsorption of $NH_3$ from air, the pre-conditioning is done with air without $NH_3$. As moisture is generally present in air to some extent, the pre-conditioning is then to be done with air with the same moisture content as the gas with the adsorbate, which in turn mimics the conditions of actual use.

In order to facilitate research in this area, there is a desire to be able to do such research in a more efficient way, typically on a smaller scale than life size. However, results should be such that they are a good predictor for adsorption on actual desired scale. Parallel testing is commonly known in other areas of chemical research, and also small scale.

U.S. Pat. No. 4,489,593 discloses a method for determining the amount of gas adsorbed or desorbed form a solid sample. Wherein a gas is introduced or withdrawn from a sample containing chamber at a substantially constant mass flow rate while measuring the pressure change within said chamber as a function of time is disclosed. An apparatus for conducting said method which uses a mass flow controller is also disclosed.

US 2007/012234 discloses a microfluidic substrate assembly and method for making same are disclosed. The substrate assembly comprises a multi-layer laminated substrate defining at least one fluid inlet port and at least one microscale fluid flow channel within the multi-layer substrate in fluid communication with the inlet port for transport of fluid.

Precise control of gas flow is required for reliable adsorption tests. Such becomes challenging when testing on small scale, as for adsorption testing on small scale (e.g. bed volumes of 0.1-10 ml) the (gas) flows are comparatively low as well (e.g. 20 to 200 Nml/min per column). Such control of gas flow becomes an even greater challenge when serving multiple adsorption beds with one feed with adsorbate, as such requires some kind of flow divider or splitter. Such divider may also cause different flows for different reactors, which will make results unreliable. Flow is typically controlled with mass flow controllers. However, mass flow controllers usually have moving parts, which results in potential breakdown or disruption, and increased complexity.

Hence, there is a need for being able to test (properties of) particulate solid adsorbent materials for adsorbate compounds like VOC's but also inorganic gasses such as $NH_3$, $SO_2$, $H_2S$, CO, $CO_2$ in an efficient and reliable way. Preferably, the test method or equipment should contain as few as possible (mass) flow controllers, as such need to be calibrated, may lead to condensation of the adsorbate, and/or are prone to disruption due to technical failure, and may have parts that are sensitive to the adsorbate.

SUMMARY OF THE INVENTION

It has now been found that the above objective can be met, at least in part, by an apparatus for conducting research on adsorption properties of particulate solid adsorption materials for an adsorbate in at least two parallel adsorption beds, the equipment comprising:

- at least two feed streams A and B of which stream A comprises an adsorbate and a gaseous base and stream B comprises said gaseous base without said adsorbate,
- a feed splitter assembly for each feed stream A and B, splitting each feed stream in N individual feed streams for A and N individual feed streams for B,
- at least N capillary channels, the inlets of which are connected to the outlets of the feed splitter for A, and at least N capillary channels, the inlets of which are connected to the outlets of the feed splitter for B, said capillary channels further having outlets, the capillary channels being capable of creating a gas pressure drop of between 1 and 100 bar for the split feed streams,
- switching valves of which the inlets are connected to the outlets of the capillary channels of A and to the outlets of the capillary channels of B, the switching valves further having outlets connected to the inlet of adsorbent beds and outlets connected to vents, wherein the total number of outlets of all switching valves is equal to the number of N adsorbent beds,
- a number of N adsorbent beds comprising the particulate solid adsorbent particles, wherein each adsorbent bed has a volume of between 0.1 to 10 ml (preferably between 0.1 and 5 ml), said adsorbent beds further having outlets,
- detection means for detecting presence and concentration of said adsorbate connected to the outlet of the adsorbent beds, and the use of such apparatus.

Hence, the invention further relates to a process for adsorbing an adsorbate to particulate solid adsorption materials in a plurality N adsorbent beds, said process comprising:

- feeding a stream A comprising an adsorbate in a gaseous base to a splitter assembly splitting stream A into N individual feed streams for A, followed by
- feeding the individual feed streams A each to a capillary channel capable of causing a pressure drop of between 1 and 100 bar in the feed of each individual feed stream A,
- feeding a stream B comprising the same gaseous base as feed A but without said adsorbate to a splitter assembly splitting stream B into N individual feed streams for B,
- feeding the individual feed streams B each to a capillary channel capable of causing a pressure drop of between 1 and 100 bar in the feed of each individual feed stream B,
- feeding the obtained individual feeds A and individual feed streams B downstream of the capillary channel to one or more selector valves, which selector valves feed either an individual feed stream A to the inlet of an adsorbent bed or an individual feed stream B to said adsorbent bed, depending on the position of the selector valve, and the non-selected feed is fed to a vent,
- leading the gas from the outlet of the adsorbent beds to detection means for detecting presence and concentration of said adsorbate.

DETAILED DESCRIPTION OF THE INVENTION

Figure 1:
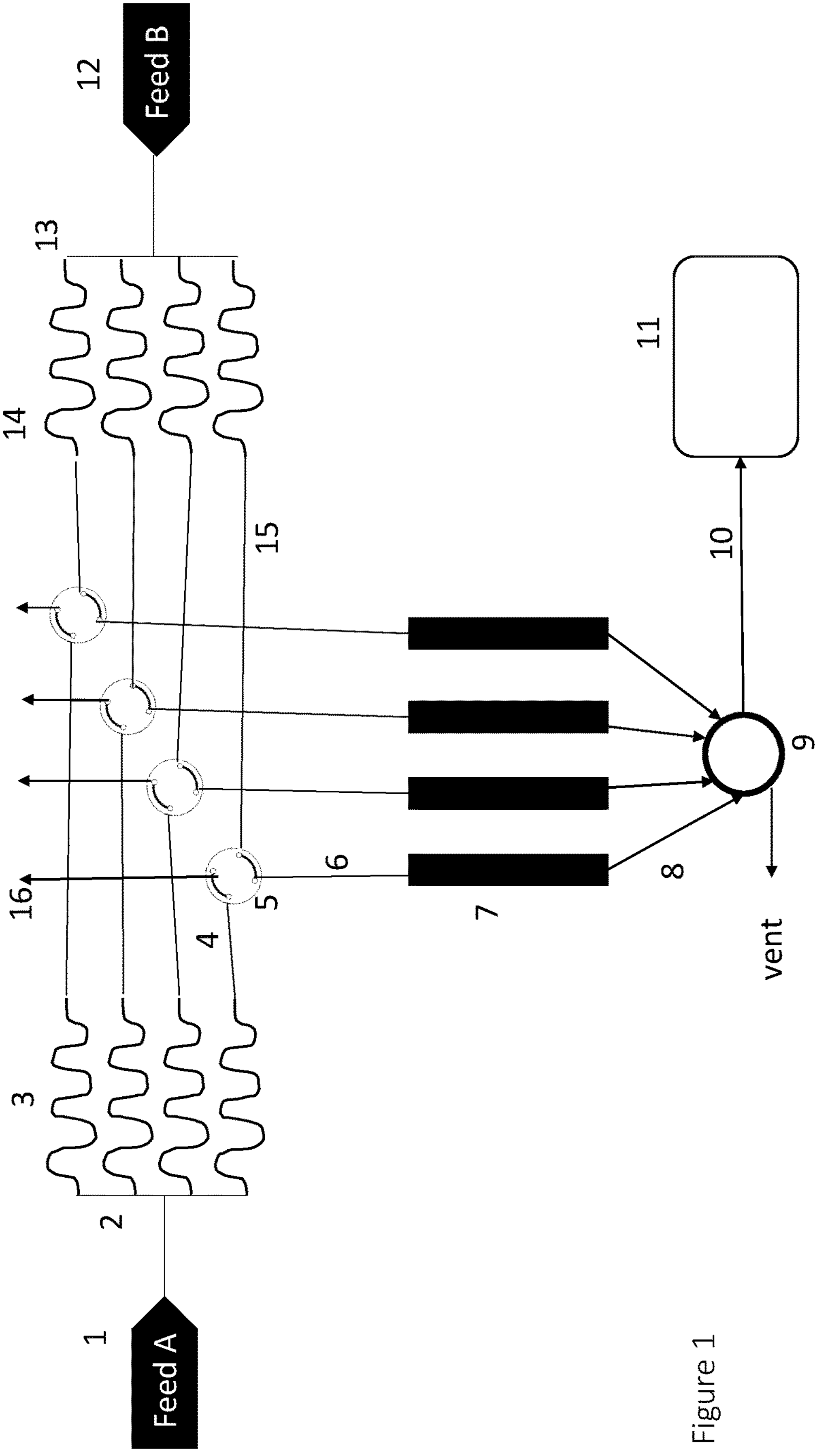
FIG. 1 is a schematic set-up of an apparatus, in accordance with one or more embodiments of the disclosure.

In the above, reference is made to "adsorption bed". An adsorption bed is herein to be understood as a container (typically a column) which contains particulate adsorption material (e.g. particles of activated carbon) and which container has an inlet and an outlet, generally at opposite ends.

It was found by the present inventors that the adsorption properties of solid particulate material to various adsorbates as are usually researched for potential application in e.g. respiratory protective device (but also for adsorption fields outside this area of application) may be done in parallel on small scale, with reliability and relatively easy, when the gas composition to be tested is manufactured at a single point at some pressure (e.g. 2-100 barg), and then by a splitter (e.g. a manifold), and reduced in pressure by capillary channels. Such capillary channels can be made fairly reliably and in a reproducible way to ensure that the pressure drop over each capillary is the same. This arrangement also ensures that any small variation in pressure drop after the splitter have comparatively little influence in the actual flow after the capillary Hence, all capillaries in a test arrangement for comparative testing preferably cause the same pressure reduction. Preferred pressure reduction by the capillaries is from 2 to 80 bars, more preferably from 5 to 50 bars, even more preferably from 5 to 30 bars. Feeds A and B should be prepared at a pressure just above the pressure drop caused by the capillaries.

It was found that having the switching valve for switching flow with and without adsorbate after the capillaries ensures that the switching has no influence on pressure on the source gas, and hence that evaporation of a more or less volatile into one of the feeds is not disrupted by variations in flow caused by switching.

To be able to provide various flows (to adapt e.g. to different adsorption materials or adsorption beds) it is preferred that the capillaries can be easily exchanged with capillaries causing a lower or higher pressure drop. An easy way to do this is to have the capillaries as part of or mounted to a cassette-like structure.

Capillaries suitable for the above can easily be made in glass, quartz, or plastics like PEEK, and typically have a diameter of between 10 and 100 μm and a length of between 0.05 and 2 meters. For practical reasons, such long capillaries are preferably constructed as a spiral-would structure, e.g. as part of a chip-like structure or cassette. Hence, in the present invention (apparatus and method) it is preferred that the capillary channels are part of a chip, preferably of glass, quartz, fused silica, or plastic (e.g. PEEK).

If all capillaries in use at the same time are part of one chip or cassette, the splitter (e.g. a manifold) may be integrated with the capillaries in the cassette or chip. This makes the equipment more robust and reduces the length of any connecting tubing. Hence, it is preferred in the present apparatus and method that sets of capillary channels are integrated with a feed splitter, preferably as part of a chip. Preferably such is done on a glass, quartz or plastic (e.g. made of PEEK) chip.

As stated, with the present apparatus a plurality of adsorption beds can be tested at the same time, in parallel, all with the same feed. This means that "N" in the above is at least 2, preferably at least 4. With such arrangement, various adsorption materials (different active material, different physical properties, particle sizes, pretreatments etcetera) can be tested and compared in performance quickly. Hence for the apparatus and method of the present of the present invention, it is preferred that number N (herein representative for the number of adsorption beds) is from 2 to 32, preferably from 4 to 16. Such beds may be mounted all together in one apparatus ensuring the same temperature for all.

In order to monitor the composition of the gas coming out of the adsorption bed and/or to perform measurements to create a breakthrough curve for the adsorbent material being tested it will be clear that downstream of the adsorption bed will need to be some form of detection means or analytical tool. Preferred analytical tools or detection means in the context of this invention are: a sensor and/or a gas chromatography (GC) analyser, infrared (IR) analyser or mass spectrometer (MS) analyser. Hence, it is preferred that the apparatus according to the present invention comprises a sensor and/or a gas chromatography (GC) analyser, infrared (IR) analyser or mass spectrometer (MS) analyser. Likewise, in the method according to the present invention it is preferred that the detection means comprises a sensor and/or a gas chromatography (GC) analyser, infrared (IR) analyser or mass spectrometer (MS) analyser, optionally via a selector valve.

There can be detection means or an analytical tool per adsorption bed, but a plurality of adsorption beds may also be served with one such detection means or analytical tool. To enable the latter, it is suitable that there is one or more selector valves situated between adsorption bed and detection means or analytical tool. For example, four adsorption beds may be connected with an 8-port selector valve, of which there are four outlets, one of which is connected to e.g. a gas chromatography (GC) analyser, infrared (IR) analyser or mass spectrometer (MS) analyser, and the other three are vents. Or four adsorption beds may be connected to two 4-port selector valves, with two outlets being connected to analytical means and two connected to vents. Hence, it is preferred for the apparatus of the present invention that downstream of the adsorbent and upstream of the detection means there are one or more selector valves for selecting one or more outlets of the adsorbent bed. And likewise other set ups may be possible, e.g. 8 adsorption beds coupled with a 16-port selector valve of which one outlet is connected to analytical means, etcetera.

In operation, adsorption beds will typically be first flushed with a feed that contains the carrier gas without the adsorbate that is being tested on the adsorption material, to condition the adsorption bed. Typically, the carrier gas, but also the carrier gas plus the adsorbate to by analysed, will be reminiscent of air, e.g. in the case of research on respiratory protective devices. Hence, it is preferred that for the apparatus and method of the present invention feed streams A and/or B further comprise moisture (i.e. water) in a concentration of 0 to 6 vol. %, preferably between 0.5 and 5 vol. %.

The adsorbate can be present in the feed in a wide range of concentrations, depending upon the gas and adsorbates that are being studied. Two extremes can be envisaged: one in which the adsorbate is considered a contaminant (e.g. $H_2S$, or a volatile organic compound) in a gas like air. Then the concentration of the adsorbate will be low, typically (for apparatus and method according to the present invention) then the adsorbate will be present in a concentration of at least 50 ppmv. Preferably, the concentration of the adsorbate in such situation will be a concentration of between 50 and 5000 ppmv. However, if the adsorbate that is subject of the study is a component that is to be adsorbed for obtaining it (e.g. $CO_2$ from an exhaust gas, or oxygen from air) then the concentration will be much higher, e.g. up to 50% by volume. Hence, the concentration of the adsorbate is preferably between 50 ppmv and 50% by volume, and then dependent on the adsorbate at aim.

In many cases vents from the switching valve located between capillary and adsorption bed will be open to atmospheric pressure. This will also mean that the adsorption beds operate at or around atmospheric pressure, which may be representative for research on respiratory protective devices. For other cases, it may be preferred that the adsorption tests are done under pressure. To enable such, it may be preferred that the vents are under pressure. Hence, it may be preferred that in the apparatus or method according to the present invention the vents from the valve are pressure controlled, e.g. with a back-pressure regulator.

As to the process according to the present invention, such is preferably conducted for performing research on adsorption properties of adsorbing an adsorbate to particulate solid adsorption materials.

Example

Figure 2:
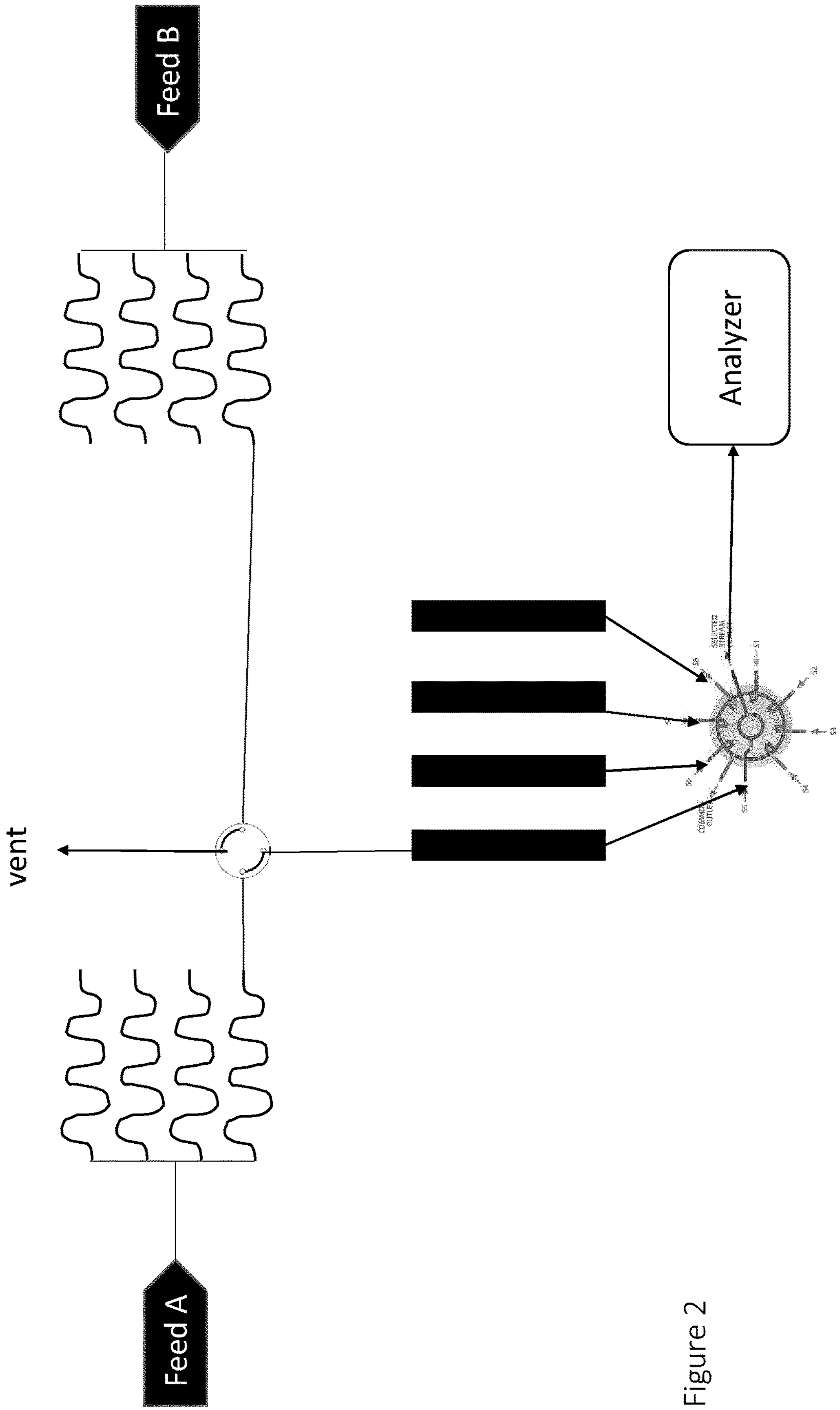
FIG. 2 is a schematic set-up of an apparatus, in accordance with one or more embodiments of the disclosure.

In FIGS. 1 and 2 there is a schematic set-up of the apparatus according to the present invention. In this, the numbers in FIG. 1 relate to:

1. pressurized feed gas A source containing adsorbate
2. manifold to split the gas into multiple parallel gas lines
3. four capillaries with restriction
4. connection to the switching valve
5. switching valve to select feed gas A or B to the column or to vent

6. connection to a column loaded with adsorbent
7. column with adsorbent
8. column outlet connected to stream selector valve
9. stream selector valve
10. line from valve to analytical device
11. analytical device (e.g. mass spectrometer)
12. pressurized feed gas B source (e.g. regeneration gas, same composition as feed gas A without adsorbate)
13. manifold to split the gas into multiple gas lines
14. four capillaries with restriction
15. outlet to vent The equipment in FIG. 2 has the same features. The difference between FIGS. 1 and 2 is the position of the switching valves between capillaries and adsorption beds. In FIG. 1 feed B is flowing from the feed through the manifold (splitter) and capillaries and via the switching valves to the adsorption beds. Feed A flows to the vents.

In FIG. 2 the switching valves have a different position, and feed A is lead to the adsorption beds and feed B to the vents.

The invention claimed is:

1. An apparatus for conducting research on adsorption properties of particulate solid adsorbent particles in N parallel adsorption adsorbent beds, the apparatus comprising:

at least two feed streams A and B of which stream A comprises an adsorbate and a gaseous base and stream B comprises said gaseous base without said adsorbate, a feed splitter assembly for each feed stream A and B, splitting each feed stream in N individual feed streams for A and N individual feed streams for B, at least N capillary channels of A, the inlets of which are connected to the outlets of the feed splitter for A, and at least N capillary channels of B, the inlets of which are connected to the outlets of the feed splitter for B, said capillary channels of A and B further having outlets, the capillary channels being capable of creating a gas pressure drop of between 1 and 100 bar for the split feed streams, switching valves of which the inlets are connected to the outlets of the capillary channels of A and to the outlets of the capillary channels of B, the switching valves further having outlets connected to the inlet of the adsorbent beds and outlets connected to vents, wherein the total number of outlets of all switching valves is N, the N adsorbent beds comprising the particulate solid adsorbent particles, wherein each adsorbent bed has a volume of between 0.1 to 10 ml, said adsorbent beds further having outlets, detection means for detecting presence and concentration of said adsorbate which detection means is connected to the outlets of the adsorbent beds, wherein the number N has the same value in each instance and is from 4 to 32, wherein downstream of the adsorbent beds and upstream of the detection means there are one or more selector valves for selecting one or more outlets of the N adsorbent beds.

2. The apparatus according to claim 1, wherein the capillary channels are made of glass, quartz or plastic.

3. The apparatus according to claim 1, wherein sets of capillary channels are integrated with a feed splitter.

4. The apparatus according to claim 1, wherein the adsorbate is present in a concentration of at least 50 ppmv.

5. The apparatus according to claim 1, wherein feed streams A and/or B further comprise moisture in a concentration of 0 to 6 vol. %.

6. The apparatus according to claim 1, wherein number N is from 4 to 16.

7. The apparatus according to claim 1, wherein the detection means comprises a sensor and/or a gas chromatography (GC) analyser, infrared (IR) analyser or mass spectrometer (MS) analyser.

8. The apparatus according to claim 1, wherein the vents from the valve are pressure controlled.

9. A process for adsorbing an adsorbate to particulate solid adsorption materials in N adsorbent beds, wherein number the N has the same value in each instance and is from 4 to 32, said process comprising:

feeding a stream A comprising an adsorbate in a gaseous base to a splitter assembly splitting stream A into N individual feed streams for A, followed by feeding the individual feed streams A each to a capillary channel capable of causing a pressure drop of between 1 and 100 bar in the feed of each individual feed stream A, feeding a stream B comprising the same gaseous base as feed A but without said adsorbate to a splitter assembly splitting stream B into N individual feed streams for B, feeding the individual feed streams B each to a capillary channel capable of causing a pressure drop of between 1 and 100 bar in the feed of each individual feed stream B, feeding the obtained individual feeds A and individual feed streams B downstream of the capillary channel to one or more switching valves, which switching valves feed either an individual feed stream A to the inlet of an adsorbent bed or an individual feed stream B to said adsorbent bed, depending on the position of the switching valve, and the non-selected feed is fed to a vent, leading the gas from the outlet of the adsorbent beds via one or more selector valves for selecting one or more outlets of the adsorbent bed to detection means for detecting presence and concentration of said adsorbate.

10. The process according to claim 9, wherein the capillary channels are made of glass, quartz or plastic.

11. The process according to claim 9, wherein sets of capillary channels are integrated with a feed splitter.

12. The process according to claim 9, wherein number N is from 4 to 16.

13. The process according to claim 9, wherein the detection means comprises a sensor and/or a gas chromatography (GC) analyser, infrared (IR) analyser or mass spectrometer (MS) analyser.

14. The process according to claim 9, wherein the process is conducted for performing research on adsorption properties of adsorbing an adsorbate to particulate solid adsorption materials.

* * * * *